No. 796,294. PATENTED AUG. 1, 1905.
E. W. CLARK.
FISH HOLDER OR BAG NET.
APPLICATION FILED DEC. 3, 1904.

Witnesses:
E. H. Wilson
A. L. Hough

Inventor:
Edwin Walston Clark,
Franklin N. Hough
By
Attorney.

UNITED STATES PATENT OFFICE.

EDWIN WALSTON CLARK, OF CHICAGO, ILLINOIS.

FISH-HOLDER OR BAG-NET.

No. 796,294.   Specification of Letters Patent.   Patented Aug. 1, 1905.

Application filed December 3, 1904. Serial No. 235,353.

*To all whom it may concern:*

Be it known that I, EDWIN WALSTON CLARK, a citizen of the United States, residing at Chicago, in the county of Cook and State of Illinois, have invented certain new and useful Improvements in Fish-Holders or Bag-Nets; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in fish holders or nets designed for attachment to a boat and so arranged that the netting will be allowed to drag in the water to keep the fish alive or dead fish fresh.

The invention consists in various details of construction and in combinations and arrangements of parts, which will be hereinafter fully described and then specifically defined in the appended claims.

My invention is illustrated in the accompanying drawings, in which—

Figure 1:
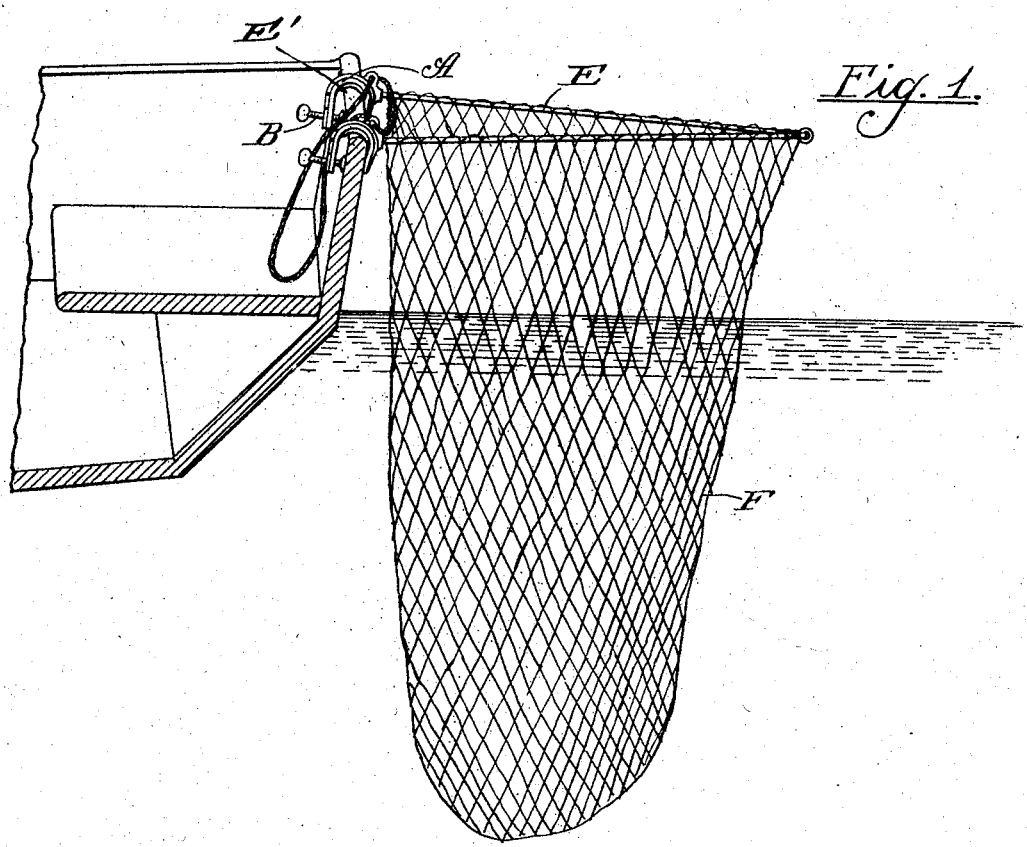
Figure 2:
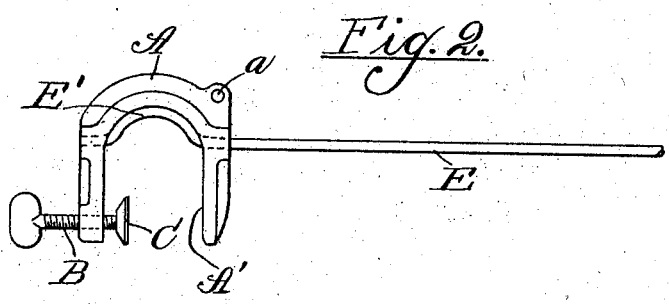

Figure 1 is a perspective view of my device shown as applied to the stern of a boat, and Fig. 2 is an enlarged detail view of one of the net-supporting members.

Reference now being had to the details of the drawings by letter, A designates a clamp member having a screw B mounted in a threaded aperture therein, said screw being provided with a head C and designed to coöperate with the jaw A' to afford means whereby the device may be clamped to the side of a boat, as shown in Fig. 1 of the drawings. Said member A has an aperture *a* formed therein, through which a rope may be passed, whereby said members may be held by a person gripping the rope when the clamp-screws are released.

E designates a rod which is bent to form a bow and upon which the netting F is mounted, and the ends of said rod are bowed at E', said bowed portion being held against the roof of the arch of the member A, as shown clearly in Fig. 2 of the drawings, whereby the rod may be held securely in a horizontal position.

In applying the device to a boat the clamping members are secured, as shown in Fig. 2, and the net may be held with a portion thereof extending down in the water, thereby providing means for keeping the fish alive or dead fish fresh.

While I have shown a particular construction of apparatus illustrating my invention, it will be understood that I may vary the details of the same, if desired, without in any way departing from the spirit of the invention.

Having thus fully described my invention, what I claim as new, and desire to secure by Letters Patent, is—

1. A fish-holder comprising clamping members adapted to be fastened to a boat, a rod secured to said clamping members, and a net supported by said rod, as set forth.

2. A fish-holder comprising clamping members, screws carried thereby with heads, a rod bent to form a bow, and a net supported by said rod, the ends of said rod held by said members, as set forth.

3. A fish-holder comprising clamping members designed to be held to the edge of a boat and provided with arched portions, a rod bent to form a bow, a net supported by said rod, the ends of said rod bent to form convexed portions which engage the arches of said members, as set forth.

4. A fish-holder comprising clamping members having apertures therein, a rod secured to said members, a net supported by said rod, and a rope passing through said apertures and secured to the members, as set forth.

In testimony whereof I hereunto affix my signature in presence of two witnesses.

EDWIN WALSTON CLARK.

Witnesses:
J. JOSEPH CURRAN,
P. J. LEISCH.